United States Patent
Chaudhuri et al.

(10) Patent No.: US 10,015,661 B2
(45) Date of Patent: Jul. 3, 2018

(54) METHODS AND SYSTEMS FOR ADMISSION CONTROL IN D2D COMMUNICATION IN A WIRELESS BROADBAND NETWORK

(71) Applicant: Wipro Limited, Bangalore (IN)

(72) Inventors: Saptarshi Chaudhuri, Bangalore (IN); Irfan Baig, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 226 days.

(21) Appl. No.: 15/001,537

(22) Filed: Jan. 20, 2016

(65) Prior Publication Data

US 2017/0156168 A1     Jun. 1, 2017

(30) Foreign Application Priority Data

Nov. 26, 2015 (IN) .......................... 6353/CHE/2015

(51) Int. Cl.
*H04W 8/00* (2009.01)
*H04W 76/14* (2018.01)
*H04L 12/28* (2006.01)

(52) U.S. Cl.
CPC ......... *H04W 8/005* (2013.01); *H04L 12/2801* (2013.01); *H04W 76/14* (2018.02)

(58) Field of Classification Search
None
See application file for complete search history.

(56) References Cited

U.S. PATENT DOCUMENTS

2014/0219261 A1   8/2014 Johnsson

2014/0244007 A1 * 8/2014 Kampman ........ G06F 19/3481
                                                          700/91

(Continued)

FOREIGN PATENT DOCUMENTS

EP         2 209 259         7/2010

OTHER PUBLICATIONS

European Search Report from the European Patent Office in counterpart European Application No. 16154124.8, dated Apr. 12, 2017 8 pages.

*Primary Examiner* — Lonnie V Sweet
(74) *Attorney, Agent, or Firm* — Finnegan, Henderson, Farabow, Garrett & Dunner LLP

(57) ABSTRACT

This disclosure relates generally to wireless communication systems, and more particularly to methods and systems for admission control in D2D communication in a wireless broadband network. In one embodiment, a method is disclosed for admission control in device-to-device communication in a wireless broadband network. The method may comprise receiving, via the hardware processor, proximity-based device-to-device discovery requests; and classifying, via the hardware processor, the received proximity-based device-to-device discovery requests into bins. The method may further include determining, via the hardware processor, priority levels for the bins; and selecting, via the hardware processor, one of the bins as having a highest priority level. The method may also include identifying in a first-in-first-out manner, via the hardware processor, one of the proximity-based device-to-device discovery requests classified into the selected bin; and generating and providing, via the hardware processor, a proximity-based device-to-device discovery response to the identified proximity-based device-to-device discovery request.

18 Claims, 10 Drawing Sheets

(56) References Cited

U.S. PATENT DOCUMENTS

2015/0063095 A1* 3/2015 Deng .................... H04W 76/18
370/221
2016/0073349 A1* 3/2016 Mohan .............. H04W 52/0251
455/426.1

* cited by examiner

METHODS AND SYSTEMS FOR ADMISSION CONTROL IN D2D COMMUNICATION IN A WIRELESS BROADBAND NETWORK

PRIORITY CLAIM

This U.S. patent application claims priority under 35 U.S.C. § 119 to: India Application No. TBD, filed DATE. The entire contents of the aforementioned application are incorporated herein by reference.

TECHNICAL FIELD

This disclosure relates generally to wireless communication systems, and more particularly to methods and systems for admission control in D2D communication in a wireless broadband network.

BACKGROUND

Device-to-device ("D2D") communications have been considered one of the key techniques in the $3^{rd}$ Generation Partnership Project (3GPP) Long Term Evolution Advanced (LTE-A) standards, where it provides direct communication among pieces of user equipment ("UEs") in close proximity. As per the 3GPP standard TS 23.303 Release 12, D2D communication among UEs is enabled by a Proximity Service ("ProSe") function server.

The inventors here have recognized several technical problems with such conventional systems, as explained below. In 3GPP standard TS 23.303 Release 12, there is no admission control mechanism for D2D communications among UEs. Since there is no admission control mechanism, the existing ProSe function server as provided in 3GPP standard TS 23.303 Release 12 gets overloaded when the number of devices and number of simultaneous D2D communication links increases in a network. This results in packet drop and decreases Quality of Service ("QoS").

In a scenario where several D2D discovery request messages from multiple UEs arrive at the ProSe function server, the signaling load at the ProSe function server increases. Also, if the ProSe function server fails to respond to received discovery request messages, then the D2D-enabled UEs cannot perform their communication, hence causing a loss of QoS.

Currently, the ProSe function server honors discovery requests solely based on subscription information (entitlement) of each UE, which leads to the following limitations. First, the ProSe function server is not designed to handle multiple discovery requests at any instant. This means that the ProSe function server will honor a single discovery request at any instant, and refuse/drop the rest, thus not allowing many initiator UEs to start D2D communication.

Second, the ProSe function server fails to differentiate among discovery requests from UEs with different levels of criticality. This may result in allowance of D2D communication to an incorrect/improper initiator UE and dropping of a more critical initiator UE out of the set of initiator UEs that had sent discovery requests simultaneously at any instant.

However, for maintaining the QoS of initiator UEs in a network, it is desired for the ProSe function server to have the following capabilities. First, it it desired that the ProSe function server be capable of handling multiple discovery requests at any instant. Second, it is desired that the ProSe function server be capable of differentiating among discovery requests coming from initiator UEs with different levels of criticality, and ensuring that the most appropriate ones are allowed in order to maintain QoS.

SUMMARY

Embodiments of the present disclosure present technological improvements as solutions to one or more of the above-mentioned technical problems recognized by the inventors in conventional systems. For example, in one embodiment, a system is disclosed for admission control in device-to-device communication in a wireless broadband network, comprising a hardware processor and a memory storing instructions executable by the hardware processor for performing a method. The method may comprise receiving, via the hardware processor, proximity-based device-to-device discovery requests; and classifying, via the hardware processor, the received proximity-based device-to-device discovery requests into bins. The method may further include determining, via the hardware processor, priority levels for the bins; and selecting, via the hardware processor, one of the bins as having a highest priority level. The method may also include identifying in a first-in-first-out manner, via the hardware processor, one of the proximity-based device-to-device discovery requests classified into the selected bin; and generating and providing, via the hardware processor, a proximity-based device-to-device discovery response to the identified proximity-based device-to-device discovery request.

In another embodiment, a method is disclosed for admission control in device-to-device communication in a wireless broadband network. The method may comprise receiving, via the hardware processor, proximity-based device-to-device discovery requests; and classifying, via the hardware processor, the received proximity-based device-to-device discovery requests into bins. The method may further include determining, via the hardware processor, priority levels for the bins; and selecting, via the hardware processor, one of the bins as having a highest priority level. The method may also include identifying in a first-in-first-out manner, via the hardware processor, one of the proximity-based device-to-device discovery requests classified into the selected bin; and generating and providing, via the hardware processor, a proximity-based device-to-device discovery response to the identified proximity-based device-to-device discovery request.

In yet another embodiment, a non-transitory computer-readable medium is disclosed storing processor-executable instructions for admission control in device-to-device communication in a wireless broadband network, the instructions comprising instructions for performing a method. The method may comprise receiving, via the hardware processor, proximity-based device-to-device discovery requests; and classifying, via the hardware processor, the received proximity-based device-to-device discovery requests into bins. The method may further include determining, via the hardware processor, priority levels for the bins; and selecting, via the hardware processor, one of the bins as having a highest priority level. The method may also include identifying in a first-in-first-out manner, via the hardware processor, one of the proximity-based device-to-device discovery requests classified into the selected bin; and generating and providing, via the hardware processor, a proximity-based device-to-device discovery response to the identified proximity-based device-to-device discovery request.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide an improved ProSe function enabled with D2D admission control in a wireless broadband network that has the ability to process multiple DRs of different levels of criticality, at any instant, and ensure that the most appropriate ones are allowed in order to maintain QoS.

Further, in some embodiments, the D2D admission control (D2DAC) mechanism is able to handle multiple discovery requests by classifying each discovery request in a composite hierarchical manner and buffering them. Pending discovery requests are not outright rejected. Instead, the ProSe function server is capable of maintaining a backlog of discovery requests that will considered for processing in a subsequent round of processing.

Further, in some embodiments, the D2DAC can perform classification of received discovery requests in a composite hierarchical manner based on the criticality, D2D-communication-mode (e.g., 1-to-1, 1-to-many) and application-need (real-time/non-real-time). This classification may be represented in the form of a composite-hierarchical-classification-index ("CHCI"). Processing of the discovery requests may be performed by the D2DAC based on the CHCI values.

Figure 1:
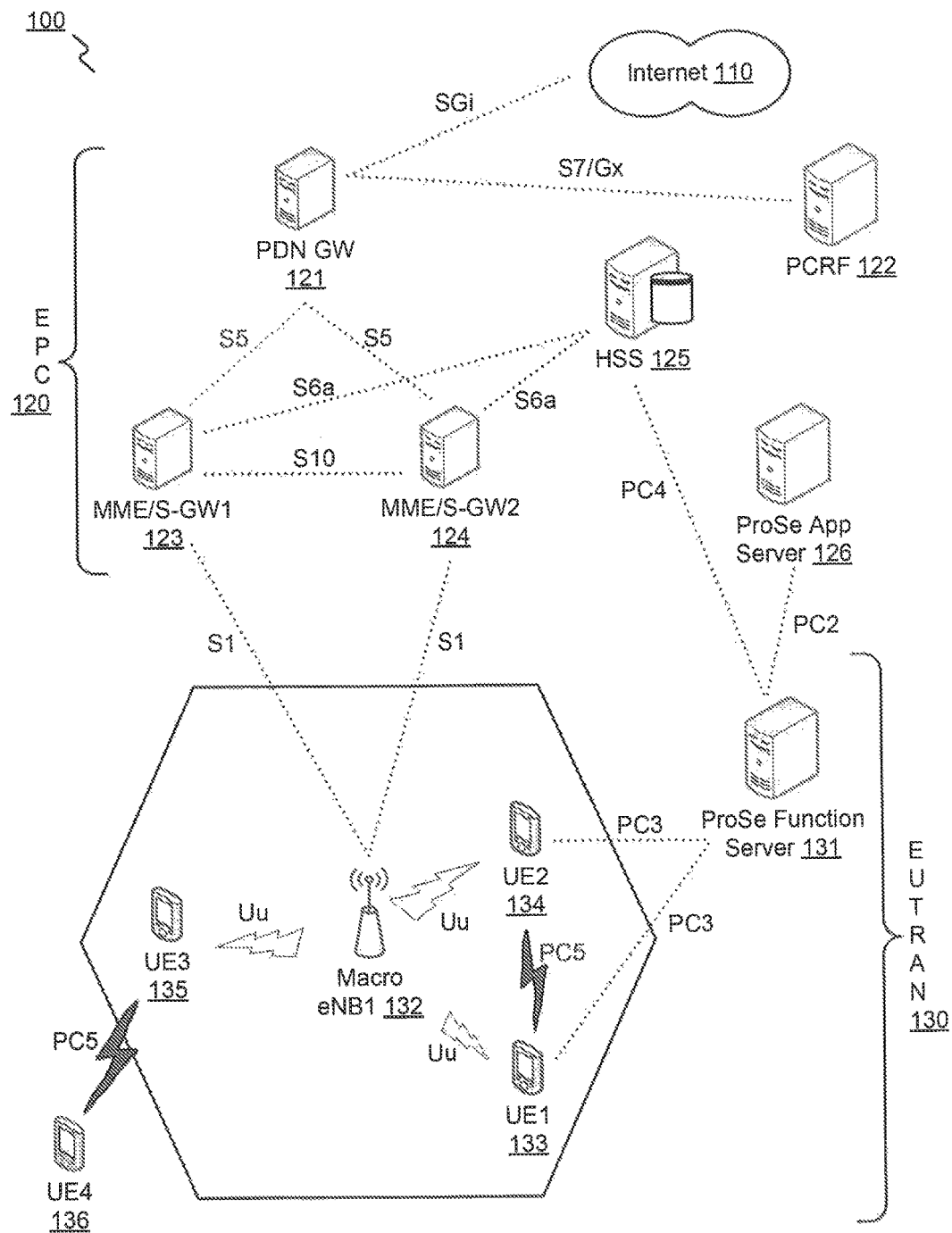
FIG. 1 is a block diagram illustrating aspects of a prior art wireless communication system.

FIG. 1 is a block diagram illustrating aspects of a prior art wireless communication system 100. In some embodiments, connected to the broader Internet 110 may be an evolved packet core ("EPC") 120. One or more pieces of user equipment (UEs) 133, 134, 15, and 136 may be connected to the EPC 120 over a E-UTRAN network 130. A Macro Evolved NodeB station eNB1 132 may serve as a base station for LTE radio. The EPC 120 may be composed of four network elements: the Serving Gateway (Serving GW 123, 124), the public data network ("PDN") Gateway (PDN GW 121), the MME (123, 124) and the Home Subscriber Server ("HSS") 125.

The gateways (Serving GW and PDN GW) deal with the user plane. They transport the IP data traffic between the User Equipment (UE) and the external networks. The Serving GW 123, 124 is the point of interconnect between the radio-side and the EPC. As its name indicates, this gateway serves the UE by routing the incoming and outgoing IP packets.

The PDN GW 121 is the point of interconnect between the EPC and the external IP networks. These networks are called PDN (Packet Data Network), hence the name. The PDN GW 121 routes packets to and from the PDNs. The PDN GW 121 also performs various functions such as IP address/IP prefix allocation or policy control and charging.

The MME (for Mobility Management Entity) 123, 124 deals with the control plane. It handles the signalling related to mobility and security for E-UTRAN access. The MME is responsible for the tracking and the paging of UE in idle-mode. It is the termination point of the Non-Access Stratum (NAS).

The HSS 125 may be a database that contains user-related and subscriber-related information. It also may provide support functions in mobility management, call and session setup, user authentication and access authorization.

The EPC is connected to the external networks, which can include the IP Multimedia Core Network Subsystem (IMS). Also, the wireless communication system 100 may include a Policy and Charging Rules Function ("PCRF") 122, which may be a software node designated in real-time to determine policy rules in a multimedia network. As a policy tool, the PCRF 122 may plays a central role in next-generation networks. Unlike earlier policy engines that were added onto an existing network to enforce policy, the PCRF 122 is usually a software component that operates at the network core and accesses subscriber databases and other specialized functions, such as a charging system, in a centralized manner.

A ProSe application server 126 and a ProSe function server 131 may provided proximity-based services for UEs. The ProSe application server 126 may support capabilities for storage and mapping of application and user identifiers. Specific application level signaling between the ProSe application server 126 and the ProSe application may be done over PC1. The ProSe application server 126 may interact with the ProSe function server 131 over the PC2 reference point. The ProSe function server 131 may perform a logical function that is used for network related actions required for ProSe. It may consist of three main sub-functions that perform different roles depending on the ProSe feature, as explained below with reference to FIG. 2.

Figure 2:
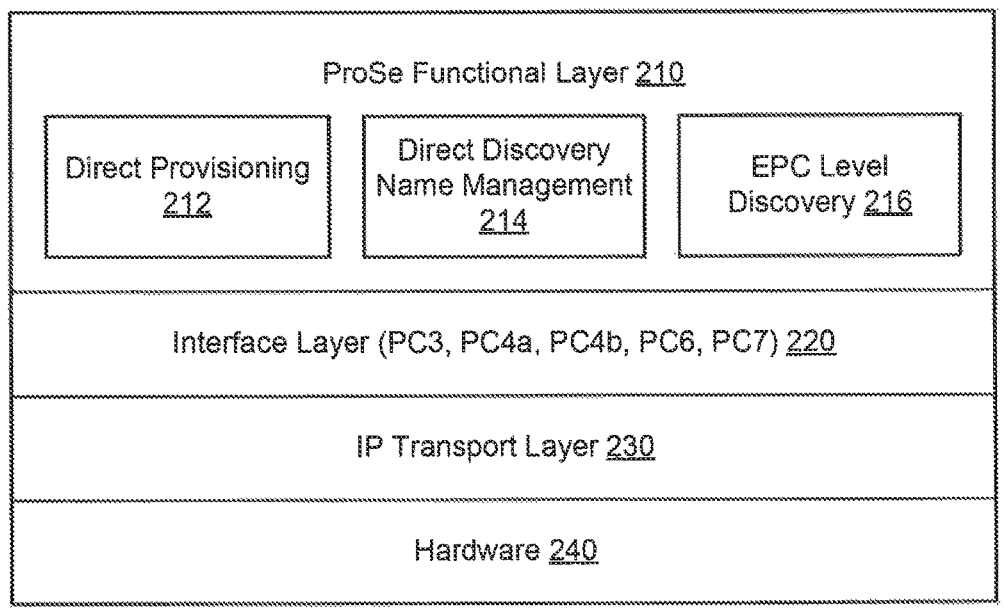
FIG. 2 is a block diagram illustrating aspects of a prior art proximity-based services (ProSe) function server.

FIG. 2 is a block diagram illustrating aspects of a prior art proximity-based services (ProSe) function server 131. In some embodiments, a ProSe function server 131 may include hardware 240 (see, e.g., FIG. 10 for a description of exemplary hardware and software components), an IP transport layer 230 for transport of packets through an Internet Protocol, and an interface layer 220 (e.g., PC3, PC4*a*, PC4*b*, PC6, PC7). Further, the ProSe function server 131 may include a ProSe functional layer 210, which may include a direct provisioning module 212, a direct discovery name management module 214, and a EPC level discovery module 216.

The direct provisioning module 212 may be used to provision a UE with necessary parameters in order to use ProSe direct discovery and ProSe direct communication. The UEs may be provisioned with public land mobile network ("PLMN")-specific parameters allowing them to use ProSe in a specific PLMN. This can include information such as a list of PLMNs in which a Use can perform direct discovery and parameters needed for direct communication when the UE is out of network coverage.

Direct discovery name management module 214 may be used for open ProSe direct discovery to allocate and process the mapping of ProSe application IDs and ProSe application codes. It may use ProSe-related subscriber data stored in a Home Subscriber Server ("HSS") for authorization of each discovery request. It may also provide the UE with necessary security data to protect discovery messages exchanged over the air interface.

EPC level discovery module 216 may be used to provide network-assisted discovery using location information to UEs.

Figure 3:
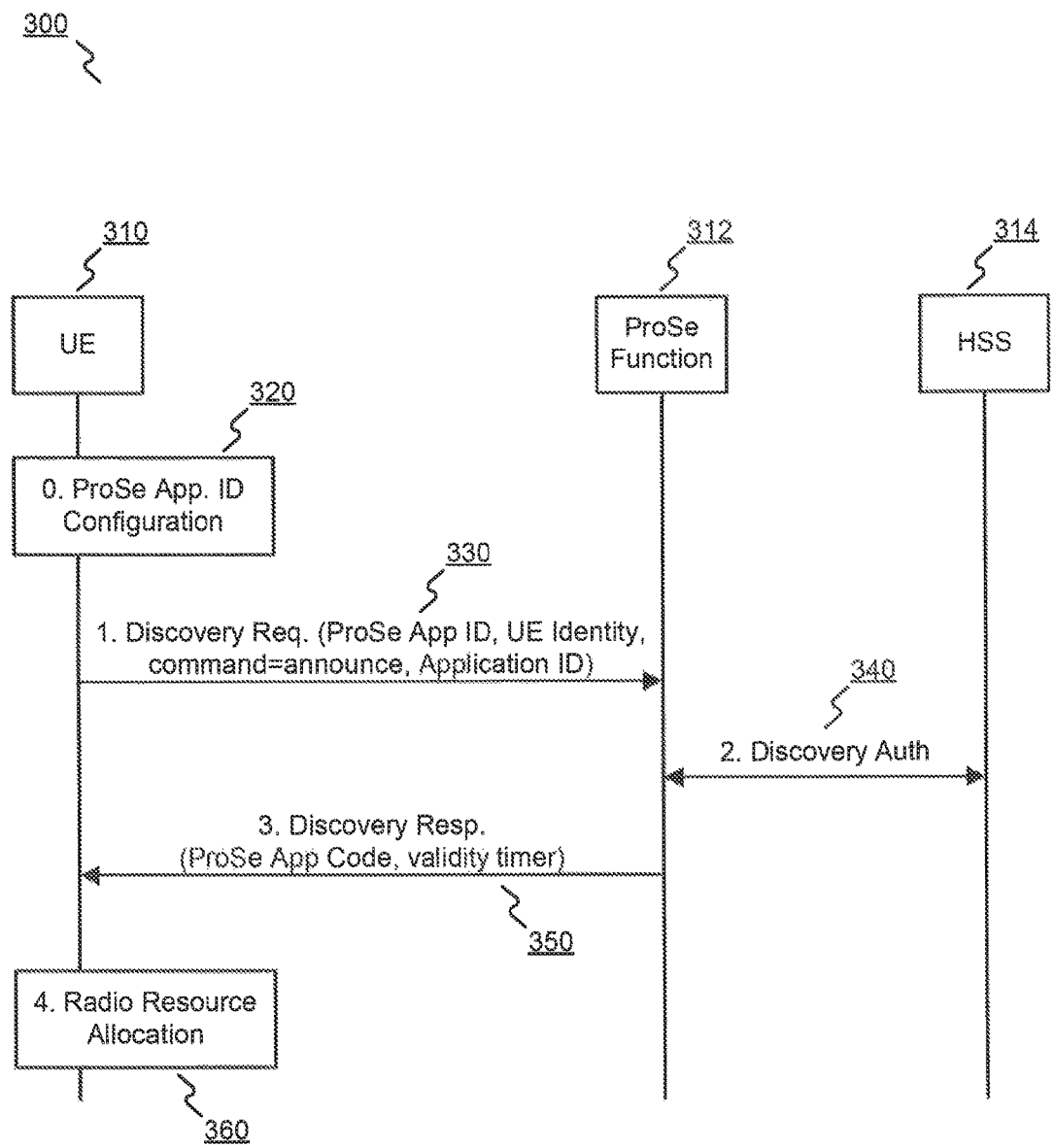
FIG. 3 is a flow diagram illustrating a prior art method for device-to-device ("D2D") communication in using a ProSe service.

FIG. 3 is a flow diagram illustrating a prior art method 300 for device-to-device ("D2D") communication in using a ProSe service. In some embodiments, a UE 310 may utilize a ProSe application ID configuration 320 to generate a D2D discovery request 330, e.g., including the ProSe application ID, UE identity, an application IP, and an "ANNOUNCE" command. A ProSe function server 312 may receive the discovery request, and may initiate a discovery authorization sequence with Home Subscriber Server ("HSS") 314 for authorization of each discovery request. Based on the authorization sequence, the ProSe function sever 312 may generate a discovery response message 350, including a ProSe application code and a validity timer, for UE 310. Based on the discovery response message 350, UE 310 a=may engage in radio resource allocation 360 for D2D communication.

Figure 4:
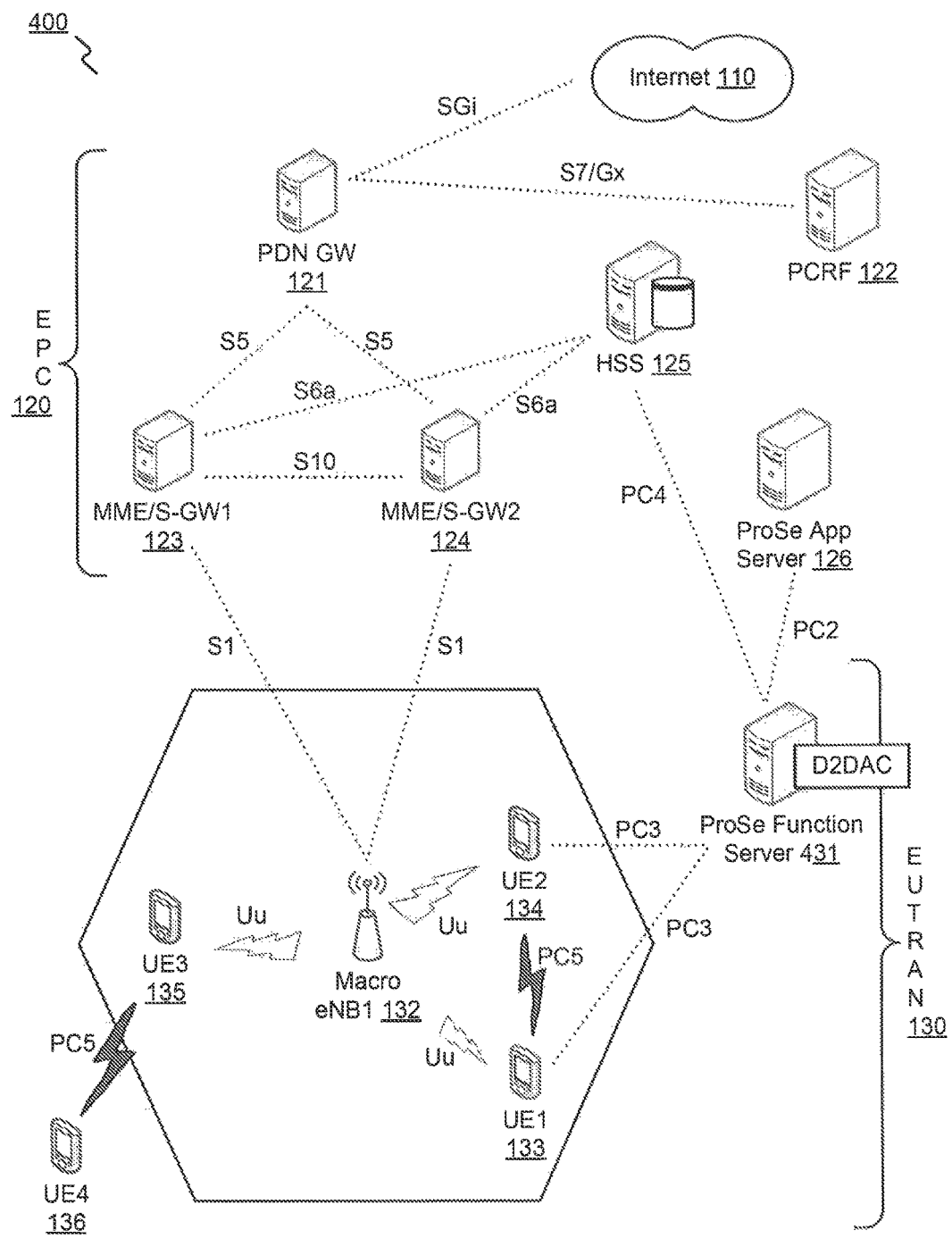
FIG. 4 is a block diagram illustrating aspects of an improved wireless communication system according to some embodiments.

FIG. 4 is a block diagram illustrating aspects of an improved wireless communication system 400 according to some embodiments. In some embodiments, system 400 may have similar components 110-136 as described above with regard to the prior art system of FIG. 1. System 400, however, may further include an improved ProSe function server 431 including a new module named "D2D Admission Control (D2DAC)." A description of the D2DAC may proceed with reference to FIG. 5.

Figure 5:
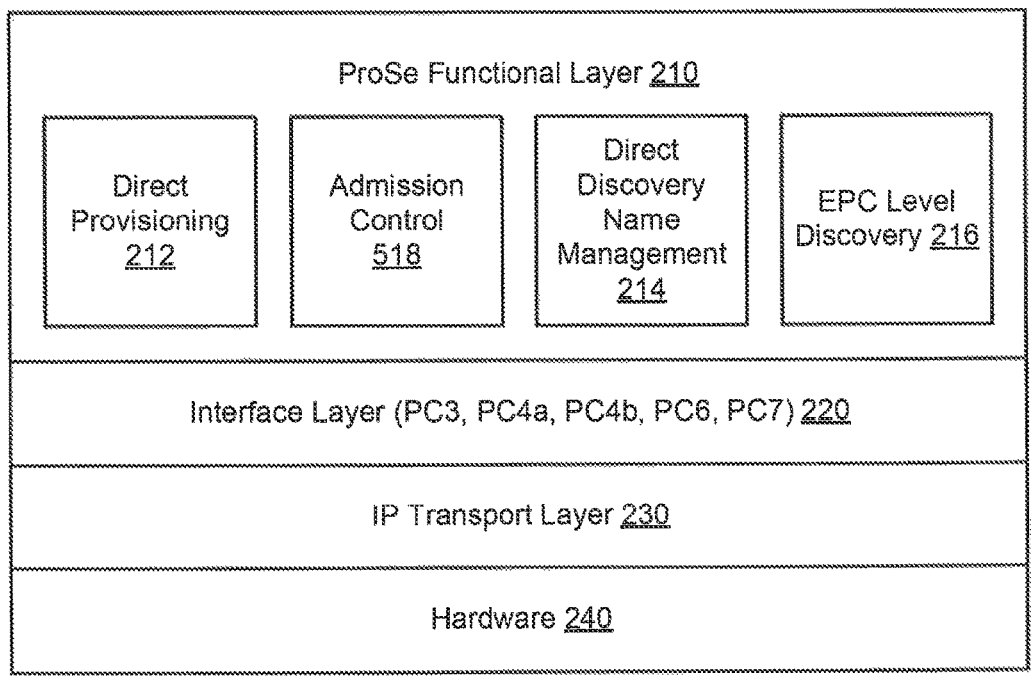
FIG. 5 is a block diagram illustrating aspects of an improved proximity-based services (ProSe) function server according to some embodiments.

FIG. 5 is a block diagram illustrating aspects of an improved proximity-based services (ProSe) function server 431 according to some embodiments. As shown in FIG. 5, the ProSe function server 431 may include similar components 210-240 as described above with respect to the prior art system 131 of FIG. 2. In addition, however, the ProSe function server may include a (D2DAC) admission control module 518. D2DAC 518 may interface with a craft-person via a command-line interface for receiving configuration details during startup of the system. Once D2DAC 518 receives the configuration details, those details may be stored into the D2DAC 518's persistent-memory. During the steady state of the ProSe system, D2DAC 518 may predominantly interact with Interface Layer 220 for performing admission control by analyzing discovery request messages. The system architecture of an exemplary embodiment of the proposed "D2D Admission Control" module is shown in FIG. 6.

Figure 6:
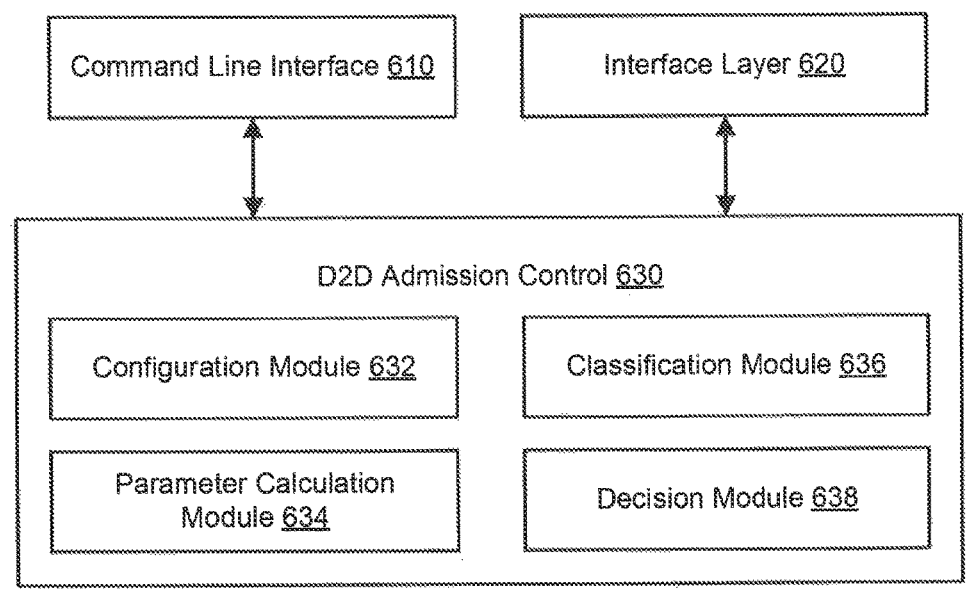
FIG. 6 is a block diagram illustrating aspects of an admission control system for a ProSe function server according to some embodiments.

FIG. 6 is a block diagram illustrating aspects of an admission control system 600 for a ProSe function server according to some embodiments. In some embodiments, a D2DAC module 630 may be responsible for performing admission control of D2D UEs by analyzing each of the discovery request messages received from the interface layer 620. A configuration module 632 may be responsible for storing the environment and configuration parameters required by all other modules of the D2DAC. The D2DAC may obtain its configuration parameters from the craft-person via the command line interface 610 and store the configuration parameters in its own local data structures. Examples of configuration parameters sored include those described below.

In some embodiments, each D2D discovery request message may be categorized into one or more application category bins. A system capacity threshold may be defined per application category bin ($SC_{threshold}$), which may be a threshold value received from command line interface 610 during system initialization. This value may be used to restrict the number of D2D devices requesting for discovery announcement per application category bin. The system capacity threshold may be used by decision module 638. For example, if there are if there are five bins defined, then five different system capacity threshold values may be obtained, as shown below:

$SC_{threshold}(1)$, $SC_{threshold}(2)$, $SC_{threshold}(3)$, $SC_{threshold}(4)$, $SC_{threshold}(5)$ A periodicity timer value may be defined ($T_{threshold}$), which may be a periodic timer received from command line interface 610 during system initialization. This value may be used to trigger the initiation of calculations related to each of the application category bins. The periodicity timer value may be used by decision module 638. For example, if there are five application category bins defined, then a single periodicity timer value may be obtained ($T_{threshold}(1)$).

In some embodiments, a classification module 636 may be responsible for classification of received discovery requests in a composite hierarchical manner. The classification module 636 may dynamically classify the packets coming from interface layer 620 based on the criticality, D2D-communication-mode (e.g., 1-to-1, 1-to-many) and application-need (e.g., real-time/non-real-time). This classification may be represented in the form of a composite-hierarchical-classification-index (CHCI), calculated by a parameter calculation module 634. The parameter calculation module 634 may also calculate a validity timer for a selected request message, to facilitate the admission control system 600 to respond back to the UE with a discovery response message.

In some embodiments, a decision module 638 may dynamically select the application category bin from which the D2D request message is selected for processing. The decision module 638 may use the parameter calculation module 634 to calculate the composite-hierarchical-classification-index (CHCI) for each application category bin. After determining the CHCI values, the application category bin with the highest CHCI may be selected, from which the request is selected to be honored.

Figure 7:
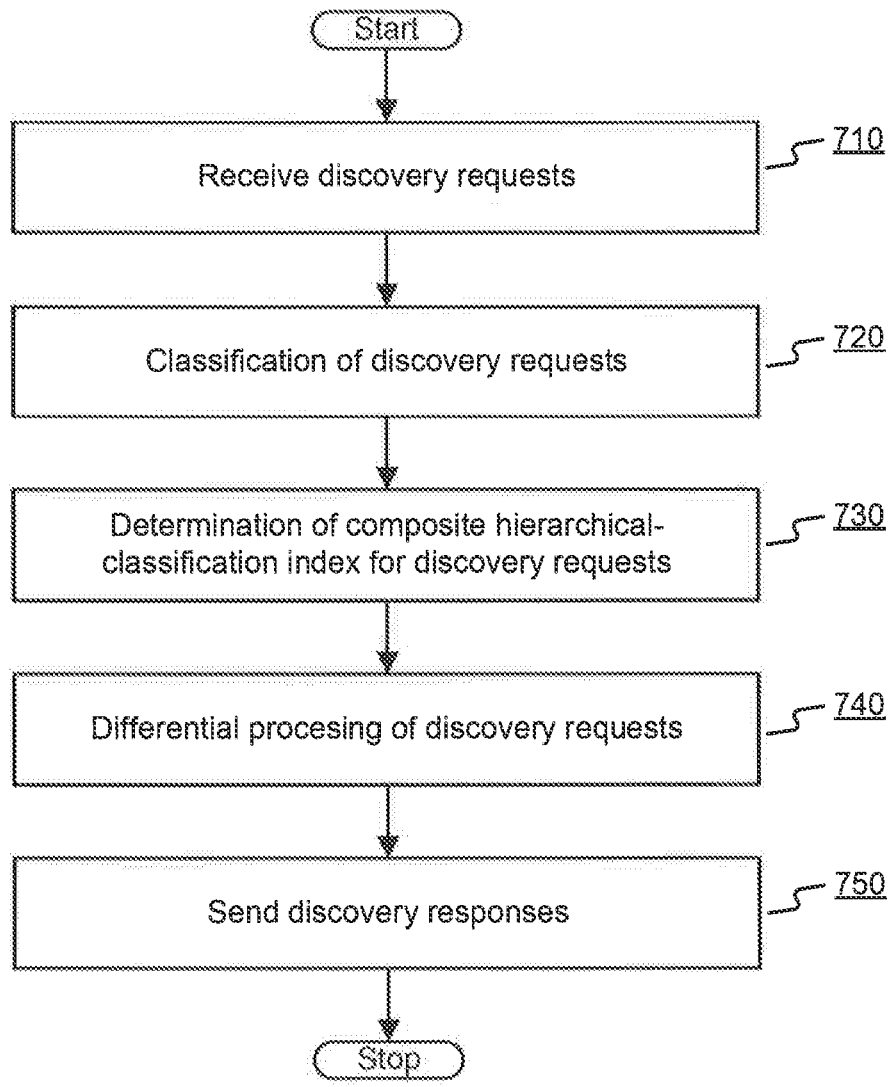
FIG. 7 is a flow diagram illustrating a method for admission control in D2D communication in a wireless broadband network according to some embodiments.

FIG. 7 is a flow diagram illustrating a method 700 for admission control in D2D communication in a wireless broadband network according to some embodiments. In some embodiments, at step 710, a ProSe function server 431 may receive one or more D2D discovery request messages from one or more UEs (e.g., UE2 134). The ProSe functional server 431 may invoke an admissions control module 518 within a ProSe functional layer 210. The admissions control module 518 may include an D2D admission control module 630, which includes a classification module 636. At step 720, classification module 636 may classify the discovery requests into one or more application category bins, as explained with reference to FIG. 8.

Figure 8:
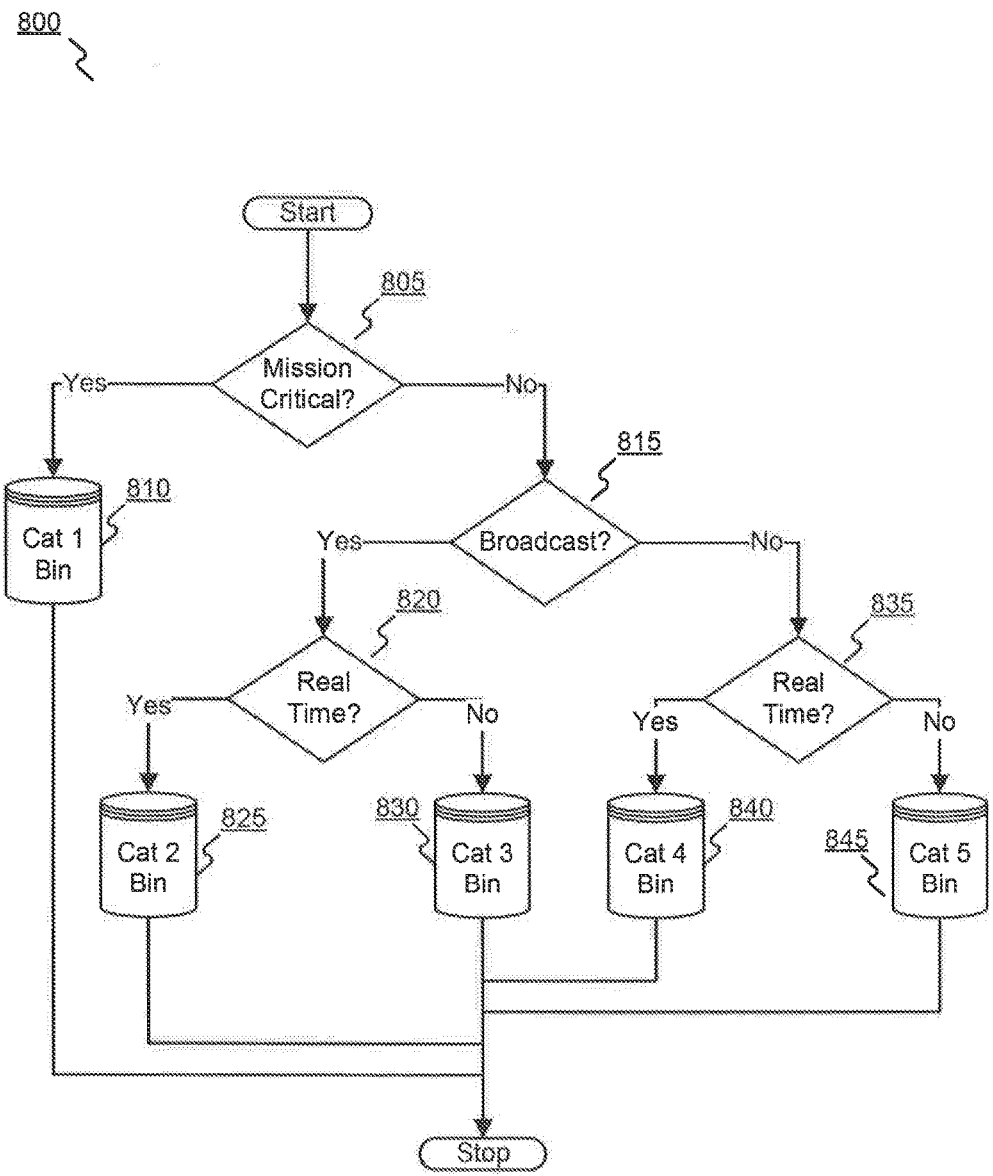
FIG. 8 is a flow diagram illustrating a method for classifying D2D discovery requests according to some embodiments.

FIG. 8 is a flow diagram illustrating a method 800 for classifying D2D discovery requests according to some embodiments. In some embodiments, a classification module 636 may extract an application code and UE identity from a discovery request. The classification module 636 may then check whether the UE with UE identity is subscribed for D2D direct discovery. If not, then the discovery request may be dropped. Further, the classification module 636 may then check whether the application represented by the application ID is authorized for direct discovery. If not, then the discovery request may be dropped.

In some embodiments, at step 805, classification module 636 may determine whether a received discovery request is considered mission critical (e.g., related to an emergency or high-priority situation). If so, classification module 636 may classify the discovery request into an application category 1 bin 810. If the classification module 636 determines that the received discovery request is not considered mission critical, the classification module 636 may, at step 815, determine whether the received discovery request is for broadcast (e.g., 1-to-many) or unicast (e.g., 1-to-1) communication.

If the discovery request is for broadcast communication, at step 820, the classification module 636 may determine whether the communication type is real-time or not. If the communication type is real-time, the classification module 636 may classify the received discovery request into an application category 2 bin 825; otherwise, the classification module 636 may classify the received discovery request into an application category 3 bin 830.

If the discovery request is for unicast communication, at step 835, the classification module 636 may determine whether the communication type is real-time or not. If the communication type is real-time, the classification module 636 may classify the received discovery request into an application category 4 bin 840; otherwise, the classification module 636 may classify the received discovery request into an application category 5 bin 845.

Returning to FIG. 7, at step 730, a parameter calculation module 634 to calculate a composite-hierarchical-classification-index (CHCI) for each application category bin, as explained with reference to FIG. 9. Further, at step 740, a decision module 638 may perform differential processing of the received discovery requests, as also explained with reference to FIG. 9.

Figure 9:
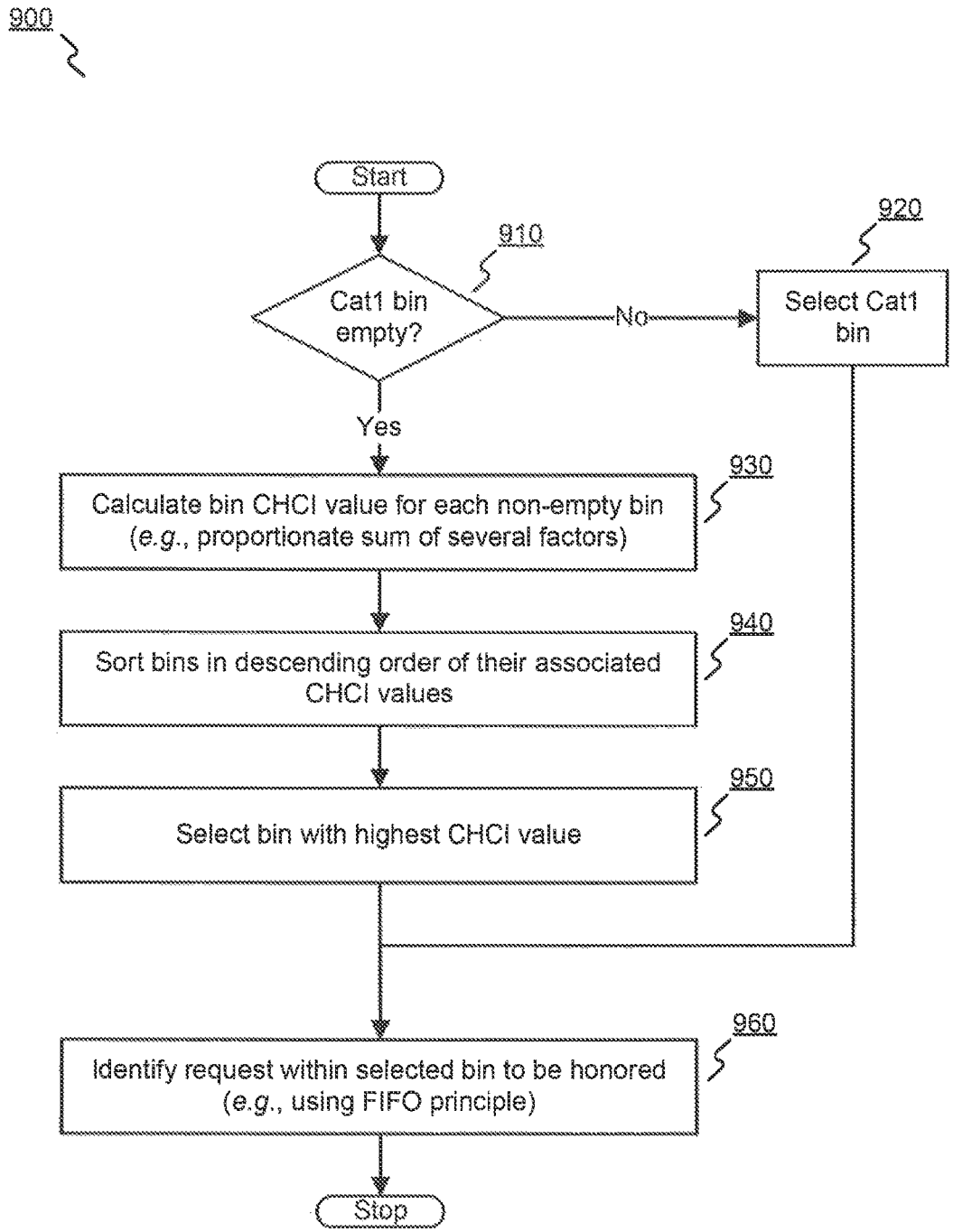
FIG. 9 is a flow diagram illustrating a method for differential processing of D2D discovery requests according to some embodiments.

FIG. 9 is a flow diagram illustrating a method 900 for differential processing of D2D discovery requests according to some embodiments. At step 910, decision module 638 may determine whether the application category 1 bin is empty. If it is not empty, at step 920, decision module 638 may select application category 1 bin, and select a discovery request message from application category 1 bin for processing. For example, decision module 638 may employ a first-in-first-out ("FIFO") principle in selecting a discovery request message from the application category 1 bin for processing (see step 960).

If the application category 1 bin is empty, at step 930, decision module 638 may invoke parameter calculation module 634 to calculate a composite-hierarchical-classification-index (CHCI) for each non-empty application category bin (e.g., application category 2-5 bins). For example, parameter calculation module 634 may calculate the CHCI value for each non-empty application category bin at every periodicity timer ($T_{threshold}$), using parameters like: (1) number of pending requests in the bin; (2) number of direct discovery requests dropped from the bin; and (3) system capacity threshold for each of the application category bins. For example, parameter calculation module 634 may calculate the CHCI value for each non-empty application category bin as a weighted sum of the above parameters.

At step 940, decision module 638 may sort the application category bins in descending order of their associated CHCI values. At step 950, decision module 638 may select the application category bin with the highest CHCI value. At step 960, decision module 638 may select a discovery request message for processing from the bin selected in step 920 or step 950. For example, decision module 638 may employ a first-in-first-out ("FIFO") principle in selecting a discovery request message from the selected application category bin for processing (see step 960).

Returning to FIG. 7, at step 750, D2D admission control module 630 may generate and provide a discovery response to the selected discovery request(s) in e.g., accordance with the 3GPP Release 12 standard.

Accordingly, in some embodiments, some advantages obtained may be as follows:

Multiple DR Processing:

In some embodiments, the D2D Admission Control (D2DAC) mechanism may be able to handle multiple discovery requests by classifying each discovery request in a composite hierarchical manner and buffering the discovery requests. Pending discovery requests may not be outright rejected. A backlog of discovery requests may be maintained that may be considered for processing in a subsequent cycle.

Differential Handling Based on Classification:

In some embodiments, the D2DAC may perform classification of received discovery requests in a composite hierarchical manner based on the criticality, D2D-communication-mode (1-to-1, 1-to-many) and application-need (real-time/non-real-time). This classification may be represented in the form of composite-hierarchical-classification-index (CHCI). Processing of the discovery requests may be performed by the D2DAC based on CHCI for effective differential handling of DR in D2D communication.

Computer System

Figure 10:
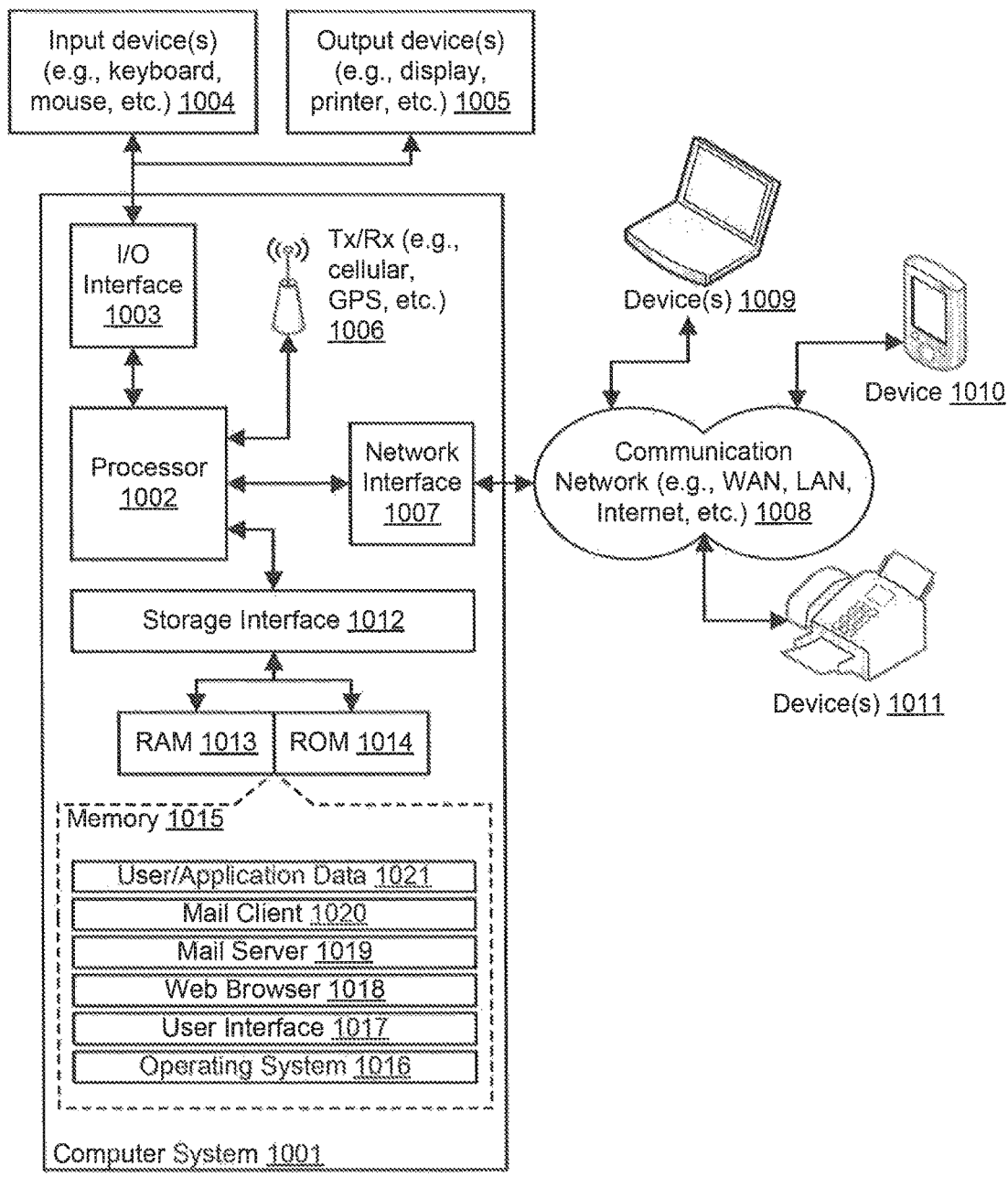
FIG. 10 is a block diagram of an exemplary computer system for implementing embodiments consistent with the present disclosure.

FIG. 10 is a block diagram of an exemplary computer system for implementing embodiments consistent with the present disclosure. Variations of computer system 1001 may be used for implementing the devices and systems disclosed herein. Computer system 1001 may comprise a central processing unit ("CPU" or "processor") 1002. Processor 1002 may comprise at least one data processor for executing program components for executing user- or system-generated requests. A user may include a person a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors. IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1010, 1011, and 1012. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface may connect to memory devices including, without limitation, memory drives, removable disc drives, etc., employing connection protocols such as serial advanced technology attachment (BATA), integrated drive electronics (IDE), IEEE-1394, universal serial bus (USE), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 1016, user interface application 1017, web browser 1018, mail server 1019, mail client 1020, user/application data 1021 (e.g., any data variables or data records discussed in this disclosure), etc. The operating system 1016 may facilitate resource management and operation of the computer system 1001. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 1001 may implement a web browser 1018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1001 may implement a mail server 1019 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client may be a mail viewing application, such as Apple Mail, Microsoft Entourage, Microsoft Outlook, Mozilla Thunderbird, etc.

In some embodiments, computer system 1001 may store user/application data 1021, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.), Such databases may be consolidated or distributed, sometimes among the various computer systems discussed above in this disclosure. It is to be understood that the structure and operation of any computer or database component may be combined, consolidated, or distributed in any working combination.

The specification has described methods and systems for admission control in D2D communication in a wireless broadband network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for admission control in device-to-device communication in a wireless broadband network, comprising: a hardware processor; and a memory storing instructions executable by the hardware processor for:
receiving, via the hardware processor, proximity-based device-to-device discovery requests;
classifying, via the hardware processor, the received proximity-based device-to-device discovery requests into bins;
determining, via the hardware processor, priority levels for the bins wherein the determining priority levels for the bins comprises:
calculating, via the hardware processor, a composite hierarchical classification index for each bin based on a weight sum of: a number of proximity-based device-to-device discovery requests in the bin, a number of proximity-based device-to-device discovery requests dropped from the bin, and a system capacity threshold for the bin; and
sorting, via the hardware processor, the bins by priority according to the calculated composite hierarchical classification index for each bin;
selecting, via the hardware processor, one of the bins as having a highest priority level;
identifying in a first-in-first-out manner, via the hardware processor, one of the proximity-based device-to-device discovery requests classified into the selected bin; and
generating and providing, via the hardware processor, a proximity-based device-to-device discovery response to the identified proximity-based device-to-device discovery request.

2. The system of claim 1, wherein the proximity-based device-to-device discovery requests are configured according to a 3GPP Long-Term Evolution standard.

3. The system of claim 1, wherein classifying, via the hardware processor, at least one of the received proximity-based device-to-device discovery requests into one of the bins is based on: a criticality of a device-to-device communication related to the at least one received proximity-based device-to-device discovery request, whether the device-to-device communication is broadcast or unicast in nature, or whether the device-to-device communication is real-time in nature.

4. The system of claim 1, wherein classifying, via the hardware processor, at least one of the received proximity-based device-to-device discovery requests into one of the bins further comprises: restricting, via the hardware processor, a number of proximity-based device-to-device discovery requests per bin based on a system capacity threshold per bin.

5. The system of claim 1, the memory further storing instructions for: triggering, via the hardware processor, the step of classifying the received proximity-based device-to-device discovery requests into bins based on a periodicity timer.

6. The system of claim 1, wherein generating, via the hardware processor, the proximity-based device-to-device discovery response to the identified proximity-based device-to-device discovery request comprises:
calculating, via the hardware processor, a validity timer value as a ratio of a default timer value of a bin corresponding to the identified proximity-based device-to-device discovery request to a system capacity threshold for the bin; and
generating, via the hardware processor, the proximity-based device-to-device discovery response to include the validity timer value.

7. A method for admission control in device-to-device communication in a wireless broadband network, comprising:
- receiving, via a hardware processor, proximity-based device-to-device discovery requests;
- classifying, via the hardware processor, the received proximity-based device-to-device discovery requests into bins;
- determining, via the hardware processor, priority levels for the bins wherein the determining priority levels for the bins comprises:
  - calculating, via the hardware processor, a composite hierarchical classification index for each bin based on a weight sum of: a number of proximity-based device-to-device discovery requests in the bin, a number of proximity-based device-to-device discovery requests dropped from the bin, and a system capacity threshold for the bin; and
  - sorting, via the hardware processor, the bins by priority according to the calculated composite hierarchical classification index for each bin;
- selecting, via the hardware processor, one of the bins as having a highest priority level;
- identifying in a first-in-first-out manner, via the hardware processor, one of the proximity-based device-to-device discovery requests classified into the selected bin; and
- generating and providing, via the hardware processor, a proximity-based device-to-device discovery response to the identified proximity-based device-to-device discovery request.

8. The method of claim 7, wherein the proximity-based device-to-device discovery requests are configured according to a 3GPP Long-Term Evolution standard.

9. The method of claim 7, wherein classifying, via the hardware processor, at least one of the received proximity-based device-to-device discovery requests into one of the bins is based on: a criticality of a device-to-device communication related to the at least one received proximity-based device-to-device discovery request, whether the device-to-device communication is broadcast or unicast in nature, or whether the device-to-device communication is real-time in nature.

10. The method of claim 7, wherein classifying, via the hardware processor, at least one of the received proximity-based device-to-device discovery requests into one of the bins further comprises: restricting, via the hardware processor, a number of proximity-based device-to-device discovery requests per bin based on a system capacity threshold per bin.

11. The method of claim 7, further comprising: triggering, via the hardware processor, the step of classifying the received proximity-based device-to-device discovery requests into bins based on a periodicity timer.

12. The method of claim 7, wherein generating, via the hardware processor, the proximity-based device-to-device discovery response to the identified proximity-based device-to-device discovery request comprises:
- calculating, via the hardware processor, a validity timer value as a ratio of a default timer value of a bin corresponding to the identified proximity-based device-to-device discovery request to a system capacity threshold for the bin; and
- generating, via the hardware processor, the proximity-based device-to-device discovery response to include the validity timer value.

13. A non-transitory computer-readable medium storing processor-executable instructions for admission control in device-to-device communication in a wireless broadband network, the instructions comprising instructions for:
- receiving, via a hardware processor, proximity-based device-to-device discovery requests;
- classifying, via the hardware processor, the received proximity-based device-to-device discovery requests into bins;
- determining, via the hardware processor, priority levels for the bins wherein the determining priority levels for the bins comprises:
  - calculating, via the hardware processor, a composite hierarchical classification index for each bin based on a weight sum of: a number of proximity-based device-to-device discovery requests in the bin, a number of proximity-based device-to-device discovery requests dropped from the bin, and a system capacity threshold for the bin; and
  - sorting, via the hardware processor, the bins by priority according to the calculated composite hierarchical classification index for each bin;
- selecting, via the hardware processor, one of the bins as having a highest priority level;
- identifying in a first-in-first-out manner, via the hardware processor, one of the proximity-based device-to-device discovery requests classified into the selected bin; and
- generating and providing, via the hardware processor, a proximity-based device-to-device discovery response to the identified proximity-based device-to-device discovery request.

14. The medium of claim 13, wherein the proximity-based device-to-device discovery requests are configured according to a 3GPP Long-Term Evolution standard.

15. The medium of claim 13, wherein classifying, via the hardware processor, at least one of the received proximity-based device-to-device discovery requests into one of the bins is based on: a criticality of a device-to-device communication related to the at least one received proximity-based device-to-device discovery request, whether the device-to-device communication is broadcast or unicast in nature, or whether the device-to-device communication is real-time in nature.

16. The medium of claim 13, wherein classifying, via the hardware processor, at least one of the received proximity-based device-to-device discovery requests into one of the bins further comprises: restricting, via the hardware processor, a number of proximity-based device-to-device discovery requests per bin based on a system capacity threshold per bin.

17. The medium of claim 13, further storing instructions for: triggering, via the hardware processor, the step of classifying the received proximity-based device-to-device discovery requests into bins based on a periodicity timer.

18. The medium of claim 13, wherein generating, via the hardware processor, the proximity-based device-to-device discovery response to the identified proximity-based device-to-device discovery request comprises:
- calculating, via the hardware processor, a validity timer value as a ratio of a default timer value of a bin corresponding to the identified proximity-based device-to-device discovery request to a system capacity threshold for the bin; and
- generating, via the hardware processor, the proximity-based device-to-device discovery response to include the validity timer value.

* * * * *